(12) United States Patent
Erickson et al.

(10) Patent No.: US 7,320,308 B1
(45) Date of Patent: Jan. 22, 2008

(54) METHOD OF CYLINDER PRESSURE SENSOR DATA/ANGLE CAPTURE FOR LOW AND HIGH RESOLUTION

(75) Inventors: Clinton W. Erickson, Russiaville, IN (US); James E. Walters, Carmel, IN (US); Karl A. Schten, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/633,951

(22) Filed: Dec. 5, 2006

(51) Int. Cl.
*F02M 7/00* (2006.01)
*F02P 5/00* (2006.01)

(52) U.S. Cl. .................. 123/435; 123/406.41
(58) Field of Classification Search ............... 123/434, 123/435, 494, 416, 406.41, 406.42, 406.58, 123/406.59; 73/35.01, 35.07
See application file for complete search history.

(56) References Cited

U.S. PATENT DOCUMENTS

| | | | | |
|---|---|---|---|---|
| 4,513,716 A | * | 4/1985 | Haraguchi et al. ..... | 123/406.36 |
| 4,744,243 A | * | 5/1988 | Tanaka .................... | 73/115 |
| 5,359,882 A | * | 11/1994 | Fukui .................... | 73/117.3 |
| 5,386,722 A | * | 2/1995 | Meyer et al. ............ | 73/117.3 |
| 5,654,501 A | * | 8/1997 | Grizzle et al. ........... | 73/118.2 |
| 5,789,658 A | * | 8/1998 | Henn et al. ............. | 73/1.37 |
| 6,354,268 B1 | * | 3/2002 | Beck et al. .............. | 123/435 |
| 2006/0106523 A1 | * | 5/2006 | Ancimer .................. | 701/111 |

* cited by examiner

*Primary Examiner*—John T. Kwon
(74) *Attorney, Agent, or Firm*—Jimmy L. Funke

(57) ABSTRACT

A method/system for measuring cylinder pressures of an internal combustion engine includes a crank angle sensor utilized to generate pressure readings at known angular intervals. Additional time-based pressure measurements are taken in selected angular windows between a pair of the angle-based pressure readings. Because the angle-based pressure measurements and the time-based pressure measurements occur at known times, the pressure as a function of the crank angle for the time-based pressure measurements can be determined. The cylinder pressure measurements can be utilized to calculate combustion parameters used for closed-loop engine control of fuel supply or other engine inputs.

20 Claims, 2 Drawing Sheets

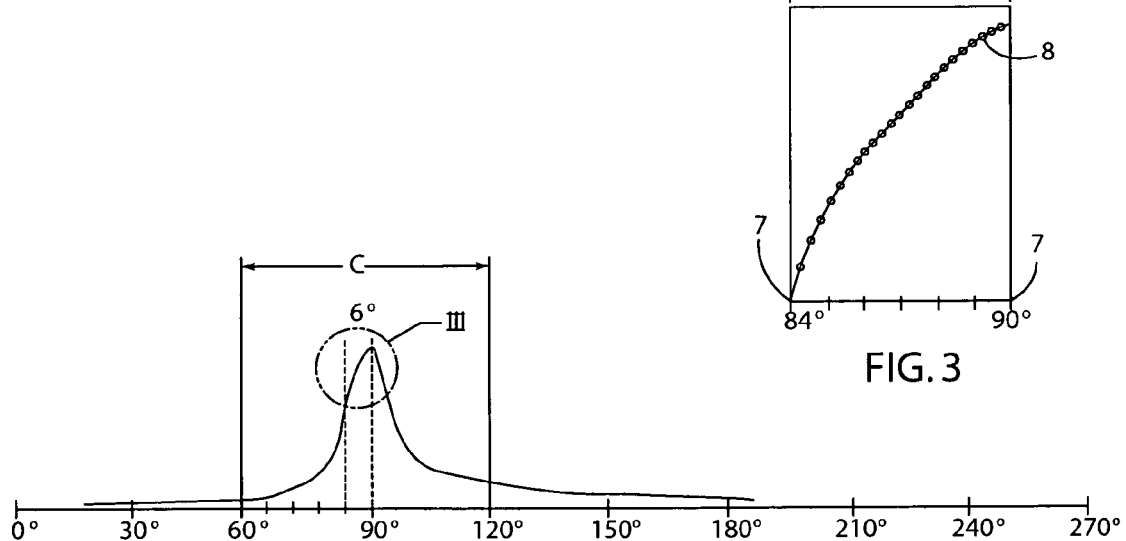

METHOD OF CYLINDER PRESSURE SENSOR DATA/ANGLE CAPTURE FOR LOW AND HIGH RESOLUTION

TECHNICAL FIELD

The present invention relates to measuring cylinder pressure in an internal combustion engine to determine combustion parameters that can be used for closed-loop engine control. Inputs such as the supply of fuel to the cylinders may be controlled to thereby improve combustion efficiency.

BACKGROUND OF THE INVENTION

The present invention provides a method to measure the cylinder pressure at a high resolution during the combustion event, while measuring the cylinder pressure at relatively low resolution during other portions of the engine cycle that are less critical to controlling the combustion process.

The calculation of cylinder pressure combustion-related data for control of both diesel and gasoline internal combustion engines has been of interest. In general, calculation of such data is based, at least in part, upon measurements of cylinder pressure by cylinder pressure sensors. The cylinder combustion wave form captured by such sensors is used to calculate engine operating parameters such as Indicated Mean Effective Pressure (IMEP), Start of Combustion, Location of Peak Pressure (LPP), etc. These parameters are then used to enhance closed-loop engine control. In an effort to provide accurate cylinder combustion parameter calculation results, each analog to digital (A/D) conversion of the sensor must be precisely aligned with the corresponding angular engine position. Cylinder pressure sensors providing data sampling with a one degree or better angular resolution may be required for accurate reproduction of the combustion wave form and required accuracy in the calculation of combustion control parameters.

In one known arrangement, voltage from the cylinder pressure sensor is fed to an A/D converter where the engine reference pulse (from the engine crank sensor) is used to trigger an A/D conversion of the sensor output at specific known engine angle references. One disadvantage of such an arrangement is that the angular resolution of available automotive engine encoders is relatively low, typically six degrees or more. This results in an angular sampling of the cylinder pressure sensor every six degrees when a sampling resolution of one degree or less is desired for more accurate cylinder pressure combustion calculations.

In an effort to overcome this problem, interpolation algorithms to generate a high-resolution encoder or reference pulse from a low-resolution reference pulse may be used. However, the interpolation function is most accurate at a constant engine speed. Furthermore, specific measurements such as Location of Peak Pressure (LPP) require a higher sample rate. Also, because engine speed is constantly changing, this method must take into account errors due to acceleration and deceleration in order to maintain the desired measurement accuracy. In general, this method tends to be software intensive.

Another solution that has been attempted in an effort to obtain higher engine resolution is to use an engine encoder capable of indicating the required resolution (360 degrees or greater) per engine revolution. However, this approach is more expensive than desired, and still limits the angular resolution to a fixed value.

Accordingly, a way to alleviate the problems associated with known pressure sensing arrangements would be beneficial.

SUMMARY OF THE INVENTION

One aspect of the present invention is a method for determining cylinder pressure in an internal combustion engine. The present invention provides a method to measure the cylinder pressure with a high resolution sample rate during the combustion event while utilizing a lower resolution position sensor. If desired, the portions of the cycle immediately preceding or following the combustion event may also be measured. The method/software provides for a user-selected angular "window" within which high resolution pressure samples are taken. The method utilizes a position sensor and target wheel or the like to measure the angular position of the crankshaft or other rotating engine component at known angular increments having a relatively low resolution. Low resolution angle-based pressure readings are generated at the corresponding angular increments. Additional time-based pressure readings at small time intervals are taken between the angular measurements in the user-selected angular "window" within the combustion event.

The method includes providing an angular position sensor capable of determining an angular position of a rotating engine component, and generating a plurality of angle-based time stamps. Each angle-based time stamp comprises an angular position of the rotating engine component and a time value associated with the angular position. The method/system utilizes at least one sensor capable of determining a cylinder pressure in an internal combustion engine, and a plurality of time-based pressure stamps generated by measuring a cylinder pressure at a plurality of predetermined time intervals. Each time-based pressure stamp includes a cylinder pressure and a time value associated with the cylinder pressure. The method/system further includes utilizing the angle-based time stamps and the time-based pressure stamps to determine cylinder pressures at associated angular positions.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 2 is a graph showing the cylinder pressure as a function of the angular position of the cylinder relative to the combustion cycle for that cylinder; and FIG. 3 is an enlarged view of a portion of the graph of FIG. 2 showing high-resolution measurement of cylinder pressure during the combustion event.

DESCRIPTION OF THE PREFERRED EMBODIMENTS

Figure 1:
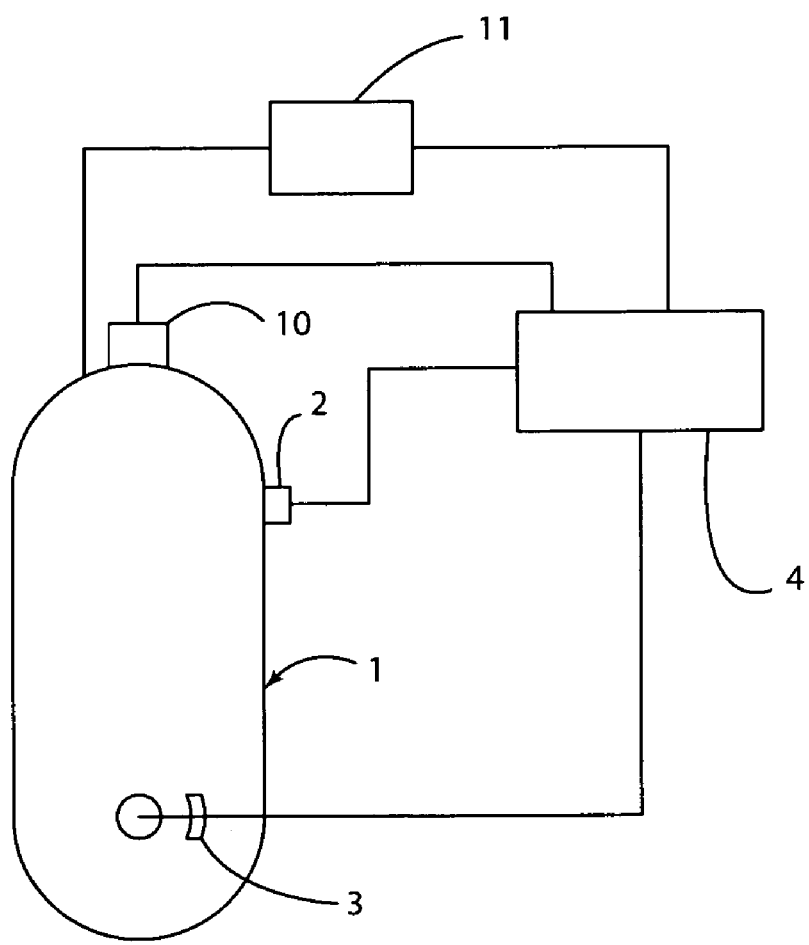
FIG. 1 is a schematic view of an internal combustion engine including a controller, sensors, and other engine control components according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, an internal combustion engine 1 includes a plurality of pressure sensors 2 that measure the cylinder pressures of each cylinder of engine 1. Pressure sensors 2 have an output voltage that varies as a function of the cylinder pressure. In the illustrated example, the cylinder pressure is proportional to the voltage output by the sensor, and the sensor thereby provides a continuous, analog pressure signal. The outputs of the pressure sensors 2 are input into analog to digital ("A/D") converters, which generate a digital pressure reading each time the A/D converters are triggered by a signal from a crank sensor 3. Crank sensor 3 generates a signal at evenly-spaced angular intervals. In the illustrated example, crank sensor 3 has a resolution of 6° and therefore generates a signal utilized to trigger the A/D converters every 6° of crank rotation, thereby generating angle-based pressure measurements and angle-based time stamps including angular position and corresponding time data.

In this way, pressure readings at known 6° angular positions and at known times are generated and supplied to controller 4. With further reference to FIG. 2, the crank of a four stroke engine will rotate 720° during a full cycle of a given cylinder. The cylinder pressure will vary significantly due to the combustion event in a crank angle range "C" of 60° to 120°, and the cylinder pressure will typically peak at around 90°. In addition to the angle-based pressure readings at 6° intervals, controller 4 also generates a large number of time-based pressure readings 8 (FIG. 3). Controller 4 also generates a "time stamp" associated with each time-based pressure reading 8, and each angle-based pressure reading 7. The time stamps are the precise times at which the pressure measurements are taken. In the illustrated example, twenty-three time-based pressure readings are generated in the 6° window W between the angle-based pressure readings 7.

Because both the angle-based pressure readings 7 and the time-based pressure readings 8 have time stamps associated with them, the cylinder pressure as a function of time, P(t), for post processing can be calculated according to the equation:

$$\theta_n = \frac{T_n - T_1}{T_2 - T_1}(\theta_2 - \theta_1) + \theta_1 \quad [1.0]$$

where a fixed speed is assumed, $T_1 < T_n < T_2$, $T_1$ and $T_2$ are the angle-based time stamps, and $T_n$ is the pressure time stamp. More complicated equations for $\theta_n$ can be assumed depending on the amount of acceleration anticipated across the 6 degree position samples.

The equation for real time processing assuming fixed speed is:

$$\theta_n = \frac{T_n - T_2}{T_2 - T_1}(\theta_2 - \theta_1) + \theta_2$$

where $T_1 < T_2 < T_n$.

In this way, the controller 4 generates a high resolution mode within window W, and a low resolution mode outside window W.

Controller 4 may be programmed to allow the size of window W to be adjusted to permit the controller to be quickly adapted for different engines and/or operating conditions. In general, the window may be 6°, 12°, 18°, or any other multiple of the angular resolution of the encoder or other sensor utilized to measure the crank angle. Also, the number of time-based pressure measurements between the angle-based pressure measurements may be adjusted by changing the time interval for the time-based pressure measurements. In this way, the size of the high resolution window and the resolution (time interval) of the time-based pressure measurements can be adjusted/selected for a specific application and/or operating condition. Also, the time intervals for the time-based pressure readings can be selected to provide the required number of time-based pressure measurements between the angle-based pressure measurements for a particular application or operating condition.

The cylinder pressure readings as a function of angle are utilized by controller 4 to calculate various known combustion-related parameters such as IMEP, MFB, LPP, etc. These parameters are utilized by controller 4 to control the timing/quantity of fuel injected by fuel injectors 10. If engine 1 is a gasoline engine (rather than a diesel engine), the spark timing, duration, and the like of the ignition system 11 may also be controlled by controller 4.

The method/control system of the present invention provides cylinder pressure readings at a high angular resolution without requiring a crank angle sensor of high angular resolution. Also, because the high resolution pressure readings may be taken over specific angular windows covering the combustion event, the controller 4 does not need to process large numbers of pressure readings from crank angles outside the window, away from the combustion event.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method of determining cylinder pressure in internal-combustion engines, the method comprising:
    providing an angular position sensor capable of determining an angular position of a rotating engine component;
    generating a plurality of angle-based time stamps, each angle-based time stamp comprising an angular position of the rotating engine component and a time value associated with the angular position;
    providing at least one sensor capable of determining a cylinder pressure in an internal combustion engine;
    generating a plurality of time-based pressure stamps by measuring a cylinder pressure at a plurality of predetermined time intervals, each time-based pressure stamp comprising a cylinder pressure and a time value associated with the cylinder pressure;

utilizing the angle-based time stamps and the time-based pressure stamps to determine cylinder pressures at associated angular positions.

2. The method of claim 1, wherein:

at least two of the angle-based time stamps define a first time interval between the time stamps;

the predetermined time intervals are substantially smaller than the first time interval.

3. The method of claim 1, wherein:

the angle-based time stamps are generated by measuring the angular position at equal angular displacements.

4. The method of claim 3, wherein:

the angular position sensor has a maximum resolution of at least about six degrees, and the angle-based time stamps are generated at the maximum resolution of the angular position sensor.

5. The method of claim 1, wherein:

the time-based pressure stamps are not utilized to determine cylinder pressures between at least one adjacent pair of the angle-based time stamps.

6. The method of claim 5, wherein:

the rotating engine component rotates through a predetermined angular displacement for each complete cycle of the internal combustion engine; and wherein:

the cylinder pressure is only measured at the angle-based time stamps during a substantial portion of the predetermined angular displacement.

7. The method of claim 1, including:

measuring cylinder pressure at the angle-based time stamps to provide pressure sampling having a first resolution during portions of the cycle wherein the cylinder pressure is substantially constant relative to cylinder pressure variations during a combustion event.

8. The method of claim 7, wherein:

a plurality of time-based pressure stamps are taken between at least a selected pair of angle-based time stamps during a combustion event to provide a second pressure sampling that is substantially higher resolution than the first resolution.

9. The method of claim 8, wherein:

the time-based pressure stamps are taken over a crankshaft rotation angle of at least about six degrees.

10. The method of claim 8, wherein:

the time-based pressure stamps are taken over a crankshaft rotation angle of at least about sixty degrees.

11. The method of claim 1, including:

determining at least one combustion-related engine operating parameter utilizing the time-based pressure stamps.

12. The method of claim 11, wherein:

the operating parameter is selected from the group consisting of indicated mean effective pressure, start of combustion, and location of peak pressure.

13. The method of claim 11, including:

controlling an input to the engine based, at least in part, on the at least one combustion-related engine operating parameter.

14. The method of claim 1, wherein:

the time-based pressure stamps are taken at a resolution of at least about one degree of crankshaft rotation.

15. A method of controlling an internal combustion engine of the type having a crankshaft that rotates seven hundred and twenty degrees during each engine cycle, the method comprising:

measuring cylinder pressure of a cylinder at a plurality of crankshaft rotation angles to generate a first set of angle-based cylinder pressure readings at known crankshaft rotation angles at a first angular resolution;

measuring cylinder pressure of the cylinder at a plurality of points between at least a selected pair of the angle-based cylinder pressure readings during a combustion event to generate a second set of cylinder pressure readings having a second angular resolution that is substantially greater than the first angular resolution;

utilizing at least some of the cylinder pressure readings in the vicinity of a combustion event to determine a combustion-related engine operating parameter;

controlling operation of the internal combustion engine based, at least in part, upon the combustion-related engine operating parameter.

16. The method of controlling an internal combustion engine of claim 15, wherein:

the second set of cylinder pressure readings are taken at preselected time intervals that are sufficiently small to ensure that a plurality of pressure readings are taken between an adjacent pair of the angle-based pressure readings.

17. The method of controlling an internal combustion engine of claim 15, wherein:

the second set of cylinder pressure readings are only generated over a user-defined range, wherein the user-defined range is substantially less than seven hundred and twenty degrees.

18. The method of controlling an internal combustion engine of claim 17, wherein:

the user-defined range is about sixty degrees of crankshaft rotation or less.

19. The method of controlling an internal combustion engine of claim 17, wherein:

the user-defined range is about six degrees of crankshaft rotation or less.

20. The method of controlling an internal combustion engine of claim 15, wherein:

the angles at which the first set of angle-based cylinder pressure readings are taken are measured by an encoder that is configured to measure the angular position of the crankshaft.

* * * * *